Patented June 16, 1942

2,286,273

UNITED STATES PATENT OFFICE 2,286,273

PRODUCTION OF AMMONIUM THIOCYANATE

William H. Hill, Stamford, Conn., assignor to American Cyanamid Company, New York, N. Y., a corporation of Maine Application August 25, 1939, Serial No. 291,815

5 Claims. (Cl. 23—75)

The present invention relates to the production of ammonium thiocyanate by reaction between liquid carbon bisulfide and liquid ammonia. It has been determined that the reaction between these two substances gives rise to a yellow product containing S and N in the proportions of 2:3 and identified only as having most likely an empirical formula corresponding to $H_9C_2N_3S_2$, and also to ammonium dithiocarbamate and ammonium thiocyanate. The production of the yellow compound and ammonium dithiocarbamate occurs only at temperatures below 40° C. Above that temperature, the end product is ammonium thiocyanate although the first two compounds mentioned may be formed at an intermediate stage.

In other words, even though the reaction takes place, for instance, at —33° C., which favors the production of the yellow compound, yet raising the temperature of the reaction magma in ammonia or in ammonia containing ammonium thiocyanate, causes conversion to ammonium thiocyanate.

Figure 1:
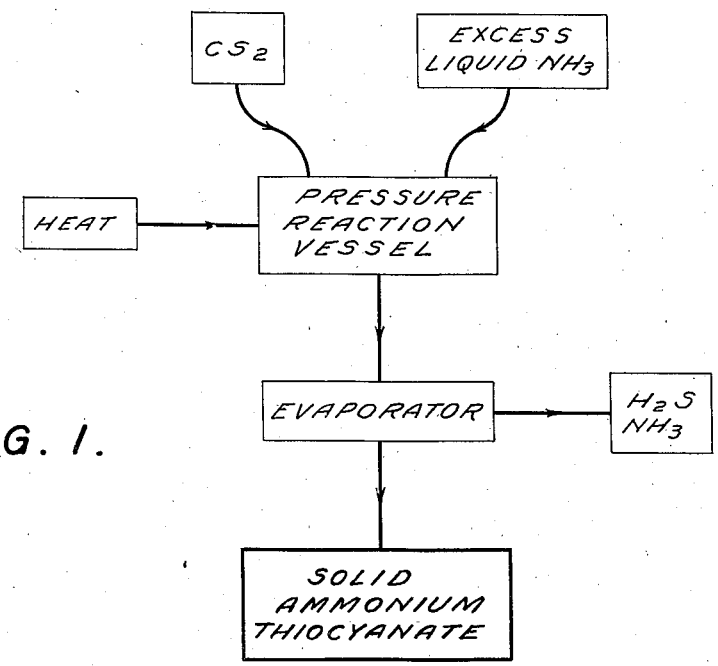

These higher temperatures for the conversion to the thiocyanate may be applied under pressure as indicated in Fig. 1 in the flow sheet, where the initial medium is substantially only excess ammonia and such quantities of ammonium thiocyanate as are gradually produced. On the other hand, by introducing sufficient quantities of ammonium thiocyanate into the liquid ammonia, the vapor pressure of the liquid ammonia may be depressed to such an extent that temperatures as high as 80° C. may be obtained at atmospheric pressure. Thus any desired temperature between the boiling point of $NH_3$ and 80° C. may be obtained by varying the content of thiocyanate.

Figure 2:
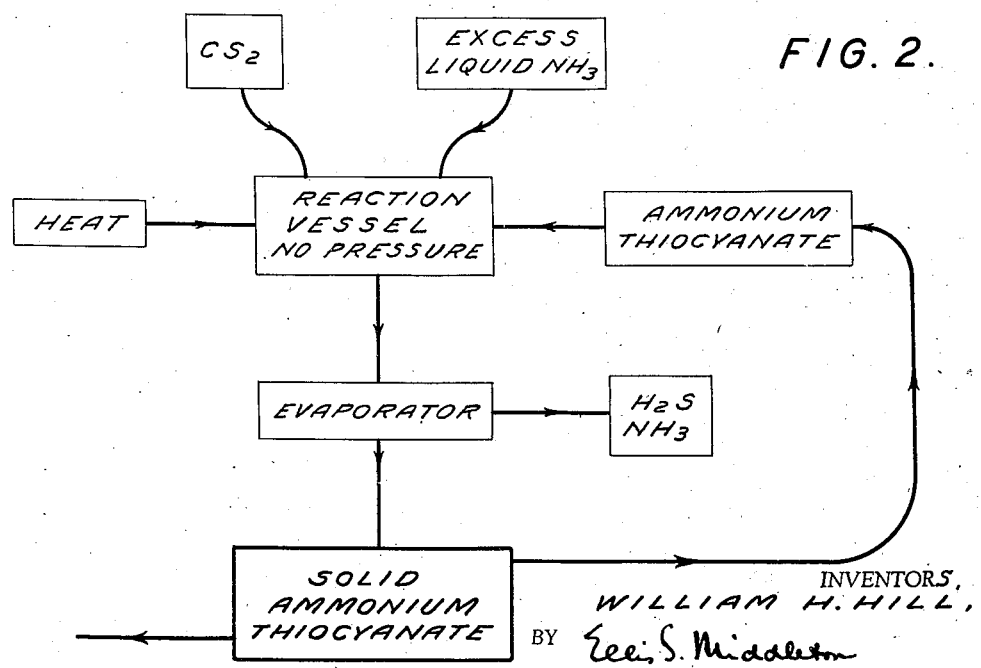

The preferred method, therefore, of reacting carbon bisulfide in excess liquid ammonia to produce optimum yields of thiocyanate with minimum difficulties is as shown in Fig. 2 of the flow sheet, to begin with an initial solution of liquid ammonia containing appreciable quantities of ammonium thiocyanate at the boiling point thereof. To this solution is added a deficiency of carbon bisulfide and the whole gradually heated. Temperatures up to the critical temperature of liquid ammonia are usable, although those not over 80° C. are preferred. Under these circumstances, the initial yellow slurry obtained as a result of the reaction gradually changes color and finally is converted to a clear thick syrupy liquid. Evaporation of this liquid expels not only ammonia but some hydrogen sulfide with the production of clear monoclinic crystals of ammonium thiocyanate in substantially quantitative yields.

By returning some of the recovered thiocyanate to the reaction vessel with fresh ammonia, a cyclic method results.

While the invention has been shown and described with particular reference to specific embodiments, it is to be understood that it is not to be restricted thereto but is to be construed broadly and limited solely by the scope of the appended claims.

I claim:

1. A method of producing ammonium thiocyanate from liquid carbon bisulfide and liquid ammonia which comprises reacting the materials at temperatures above 35° C., evaporating the liquid product and recovering the solid ammonium thiocyanate.

2. A method of producing ammonium thiocyanate from liquid carbon bisulfide and liquid ammonia which comprises reacting the same to form a voluminous yellow precipitate and heating the reaction magma under pressure to convert the yellow product to ammonium thiocyanate.

3. A method of producing ammonium thiocyanate which comprises reacting carbon bisulfide and ammonia in the initial presence of sufficient quantities of ammonium thiocyanate so that a temperature between the boiling point of ammonia and 80° C. may be obtained in the reacting magma at atmospheric pressure, and carrying out the reaction at that temperature and that pressure until substantially quantitative conversion to ammonium thiocyanate has taken place.

4. A method of producing ammonium thiocyanate which comprises reacting carbon bisulfide and ammonia in the initial presence of ammonium thiocyanate, heating to effect a conversion of the reaction products to ammonium thiocyanate and recovering the latter.

5. A method of producing ammonium thiocyanate which comprises reacting carbon bisulfide and ammonia in the initial presence of ammonium thiocyanate, heating to effect a conversion of the reaction products to ammonium thiocyanate and recovering the latter and returning some of the thiocyanate to the start of the cycle.

WILLIAM H. HILL.